(12) United States Patent
Stenvall

(10) Patent No.: US 10,625,784 B2
(45) Date of Patent: Apr. 21, 2020

(54) VEHICLE

(71) Applicant: Volvo Car Corporation, Göteborg (SE)

(72) Inventor: Lars Stenvall, Ljungskile (SE)

(73) Assignee: Volvo Car Corporation, Göteborg (SE)

( * ) Notice: Subject to any disclaimer, the term of this patent is extended or adjusted under 35 U.S.C. 154(b) by 45 days.

(21) Appl. No.: 16/101,624

(22) Filed: Aug. 13, 2018

(65) Prior Publication Data

US 2019/0054956 A1 Feb. 21, 2019

(30) Foreign Application Priority Data

Aug. 17, 2017 (EP) ..................................... 17186568

(51) Int. Cl.
*B62D 21/15* (2006.01)
*B60K 1/04* (2019.01)
(Continued)

(52) U.S. Cl.
CPC .............. *B62D 21/152* (2013.01); *B60K 1/04* (2013.01); *B60L 50/64* (2019.02); *B60R 19/18* (2013.01); *B62D 25/08* (2013.01); *B60K 2001/0411* (2013.01); *B60R 2019/1806* (2013.01); *B60Y 2306/01* (2013.01); *B62D 21/155* (2013.01)

(58) Field of Classification Search
CPC ..... B62D 21/152; B62D 21/155; B60L 50/64; B60K 1/04; B60K 2001/0411; B60R 19/18; B60R 2019/1806; B60Y 2306/01
See application file for complete search history.

(56) References Cited

U.S. PATENT DOCUMENTS 4,042,054 A * 8/1977 Ward ....................... B60K 1/04
180/60
10,463,219 B2 * 11/2019 Koura ................... A47L 9/1418
(Continued)

FOREIGN PATENT DOCUMENTS

DE 102006011145 A1 9/2007
DE 10201018729 A1 11/2011
(Continued)

OTHER PUBLICATIONS

Feb. 2, 2018 European Search Report issue on International Application No. EP17186568.6.

*Primary Examiner* — Lori L Lyjak
(74) *Attorney, Agent, or Firm* — Clements Bernard Walker; Christopher L. Bernard

(57) ABSTRACT

A vehicle comprising: at least one electric motor configured for driving the vehicle; a battery pack configured to supply the electric motor with electric power for driving the vehicle; a vehicle body frame structure configured to form a main supporting structure of the vehicle; and a collision energy absorbing system configured to absorb collision energy in the event of an accident. The collision energy absorbing system comprises a first absorbing structure that is positioned between the battery pack and a front of the vehicle, wherein the first absorbing structure is configured to, in case the vehicle is subject to a head-on collision with an object, act against the object and absorb all or most of a collision energy of the battery pack without transferring the battery pack collision energy to the vehicle body frame structure.

13 Claims, 4 Drawing Sheets

(51) Int. Cl.
 *B60R 19/18* (2006.01)
 *B60L 50/64* (2019.01)
 *B62D 25/08* (2006.01)

(56) References Cited

U.S. PATENT DOCUMENTS

| | | |
|---|---|---|
| 2012/0175177 A1 | 7/2012 | Lee et al. |
| 2014/0361740 A1* | 12/2014 | Suzuki ................. H02J 7/0027 320/108 |
| 2015/0360549 A1 | 12/2015 | Merkel |
| 2015/0360631 A1 | 12/2015 | Herbert et al. |

FOREIGN PATENT DOCUMENTS

| | | |
|---|---|---|
| DE | 102010018729 A1 | 11/2011 |
| DE | 102013102501 A1 | 9/2014 |
| EP | 1508512 A1 | 2/2005 |
| WO | 2015019742 A1 | 2/2015 |

\* cited by examiner

VEHICLE

CROSS-REFERENCE TO RELATED APPLICATION

The present patent application/patent claims the benefit of priority of co-pending European Patent Application No. 17186568.6, filed on Aug. 17, 2017, and entitled "VEHICLE," the contents of which are incorporated in full by reference herein.

TECHNICAL FIELD

This invention relates to a vehicle. In particular, the invention relates to how to design a collision energy absorbing system for an electric vehicle provided with a heavy battery pack.

BACKGROUND OF THE INVENTION

Electric vehicles are about to form a widespread alternative to vehicles provided with internal combustion engines. A plug-in electric vehicle is equipped with one or more electric motors operatively connected to the driving wheels of the vehicle and a battery pack for storage of electric energy.

A rather large and heavy battery pack is needed for running a vehicle on electric energy over distances that are sufficiently long, say, more than 100-200 km, to make plug-in electric vehicles a really interesting alternative. A challenge in the development of electric vehicles is the design of such a battery pack and how to install it in the vehicle. Besides the considerable weight and dimensions of the battery pack, there are regular safety demands with regard to collision energy absorption for the vehicle, etc., and for electric vehicles there are further safety issues related to damage of the battery pack and to electric hazards (short circuits, etc.).

Battery packs for electric cars are typically arranged in the bottom of the vehicle below the floor of the passenger compartment. An advantage of such an arrangement is that it provides for a low centre of gravity for the vehicle. Various arrangements have been presented for how to design the body frame structure for such vehicles and for addressing the different safety aspects, such as avoiding puncture of the battery pack, which might lead to fires that are difficult to extinguish.

US2013/0252059 discloses an under-floor battery pack arrangement that is stated to provide dimensional stability of parts while reducing the weight using a plastic composite.

US2013/0119706 discloses a floor-mounted battery pack supported by a vehicle body frame that includes deformable shock absorbing members that, when buckling in the event of, e.g., a head-on collision, causes rigid members to be positioned in a certain manner so that short circuits/ground fault can be prevented.

Although there are a lot of designs proposed for electric vehicles that solve particular problems, there is still a need for solutions that generally improve safety for electric vehicles, simplify production, etc.

SUMMARY OF THE INVENTION

The invention concerns a vehicle comprising: at least one electric motor configured for driving the vehicle; a battery pack configured to supply the electric motor with electric power for driving the vehicle; a vehicle body frame structure configured to form a main supporting structure of the vehicle; and a collision energy absorbing system configured to absorb collision energy in the event of an accident.

The collision energy absorbing system comprises a first absorbing structure that is positioned between the battery pack and a front of the vehicle, wherein the first absorbing structure is configured to, in case the vehicle is subject to a head-on collision with an object, act against said object and absorb all or most of a collision energy of the battery pack without transferring said battery pack collision energy to the vehicle body frame structure.

Thus, most or all of the collision energy of the battery pack in such a collision will be distributed between the first absorbing structure and the object the vehicle collides with. Accordingly, the body frame structure is exposed to zero or only a small fraction of the collision energy originating from the battery pack (but to a lot of other collision energy, of course). This means that the body frame structure does not have to be designed to handle the potentially considerable head-on collision energy of the (heavy) battery pack, which in turn means that the structure of the body frame structure can be made less complex. This provides possibilities for reducing the weight of the body frame structure and making the production of the electric vehicle more cost-efficient.

The first absorbing structure may extend in a substantially longitudinal direction of the vehicle between the battery pack and a front of the vehicle and may contain one or several deformation sections/parts configured to absorb collision energy while deforming (buckling, bending, crumpling, etc.), and the first absorbing structure is preferably designed to handle also off-set head-on collisions. Besides deformation sections, the first absorbing structure may comprise airbags or other collision energy absorbers. Components of this type are known as such. The first absorbing structure may also contain one or several rigid sections/parts that chiefly have the function of forming extensions to make the first absorbing structure reach all the way from the battery pack to the front of the vehicle.

The deformation sections of the first absorbing structure may contain crumple crash boxes, collapsible honeycomb structures, various bars, etc. Straight or bent bars may be designed to bend at certain positions when compressed and/or may extend in a direction exhibiting an angle to both the longitudinal direction of the vehicle and a vertical plane perpendicular to the longitudinal direction.

As a basic example with only horizontally directed straight bars, the first absorbing structure may comprise first and second bars extending from opposite side portions of the battery pack in a diagonally forward direction towards a centreline of the vehicle so that the two bars and the front of the battery pack roughly forms a triangle with the tip/apex pointing towards the front of the vehicle. A sharp tip can be avoided by removing the tip part, shortening the first and second bars and connecting the first and second bars at their front ends with a further, transversal bar. The first and second bars will then be directed so as to be capable of deforming/bending and absorbing collision energy if the vehicle collides head-on with an object and the first and second bars act against the object and thereby become subject to a longitudinally directed collision force.

The first absorbing structure does not necessarily have to extend to the very front of the vehicle. Parts that absorb only small amounts of collision energy, such as a grille or other outer parts, can be placed at the very front of the vehicle. Rigid parts that simply transfer the collision energy in the longitudinal direction can also be positioned in front of the first absorbing structure. Such a rigid part may be a transversally extending bumper beam/cross bar that forms part of the vehicle body frame structure. Also, a subframe positioned below the vehicle body frame structure at the front of the vehicle may comprise a similar (secondary) bumper beam/cross bar. A bumper beam/cross bar may protrude at the very front of the vehicle to prevent that headlights, grille or other exterior parts are damaged at low-energy collisions.

The vehicle body frame structure may comprise two longitudinally extending side members connected to a main bumper beam/cross bar. It is common to design a vehicle's collision energy absorbing system so that the connections between the bumper beam and the side members deform, or so that a front part of the side members themselves deform/crumple/bend, in case of a sufficiently energetic head-on collision. The bumper beam will thus come closer to a rear of the vehicle in an accident of this type. Such a design of the vehicle's energy absorbing system has no particular effect on the function of the design of the present disclosure since the first absorbing structure still can act against the object collided with, via the bumper beam if positioned in between, and handle the collision energy of the battery pack without involving the vehicle body frame structure.

Accordingly, there might be some vehicle parts present between the first absorbing structure and the object at the collision, so said first absorbing structure does not necessarily have to extend to the very front of the vehicle.

When the vehicle is provided with a collision energy absorbing system as described above, i.e., where a front part of the body frame structure is deformable, it is an advantage if the first absorbing structure is adjusted to the properties of the body frame and to the particular weight/size of the battery pack so that the first absorbing structure deforms in a similar rate and to a similar extent as the body frame during the collision. If so, the battery pack does not move in relation to the body frame during the collision (except in relation to the deformed front part of the body frame). This makes it easier to arrange for the support of the battery pack in the body frame and it also reduces the risk of damaging the battery pack during the collision.

The battery pack is arranged in a releasable manner in relation to the vehicle body frame structure so as to allow the battery pack to move towards the front of the vehicle and thereby allow the first absorbing structure to handle the collision energy of the battery pack independently of the vehicle body frame structure. Such a relative movement of the battery pack should normally be prevented unless the vehicle is exposed to collision forces exceeding a certain threshold value (to avoid movement of the battery when breaking hard or in low-energy collisions when the collision energy can be absorbed by other means).

The battery pack may be fixed to or arranged onto a sub-frame that may be releasably attached to the vehicle body frame structure and that may form part of the first absorbing structure. The sub-frame may be isolated from the vehicle body frame structure via rubber bushings and may comprise its own crash structure, adapted to the weight of the particular battery pack used. A suitable sub-frame for this purpose is a (modified) front sub-frame used for, e.g., front wheel suspension.

In principle, the battery pack can be placed almost anywhere in the vehicle as long as the first absorbing member is properly arranged. However, in a particularly advantageous variant of the invention, the vehicle is a passenger car where the battery pack is positioned in what conventionally is referred to as the engine bay, i.e., in front of a passenger compartment of the passenger car. Since the body frame structure does not have to be adapted to handle the additional head-on collision energy of the battery pack, this means that the same or close to the same body frame structure and general vehicle structure that previously has been used for a driving system including an internal combustion engine, etc. also can be used when the vehicle is converted into an electric vehicle including the battery pack, etc. Some adaptations are of course needed for housing one or more electric motors, batteries and various electronics instead of an engine, an exhaust system and a fuel tank, etc., but the general structure of the vehicle can be the same, which is in contrast to the designs where the battery pack is arranged under the floor of the passenger compartment.

A great advantage of this is that it is not required to develop a new platform for producing a new body frame, chassis, etc., particularly adapted to electric vehicles. Since the existing vehicle platform can be used it becomes considerably simpler and less costly to produce electrical vehicles. A further advantage is that even if there is a desire to develop a new platform this can be postponed some years until there is a better knowledge of the future performance of batteries, etc. For instance, if batteries get much more effective with higher capacity the total weight and size of the battery pack might be much smaller than today which affects the design of the vehicle and thus the platform.

The battery pack arranged in the "engine bay" may be given a size, shape and weight similar to that of the engine previously arranged in the same place. This means for instance that a deformation zone may be arranged in front of the battery pack where the first absorbing structure is positioned and where the vehicle body frame structure is arranged to be deformable. A deformation zone may also be arranged at the rear of the battery pack, i.e., between the battery back and the passenger compartment.

A further advantage of placing the battery pack in the "engine bay", and in particular in case the battery pack is designed to at least roughly resemble the shape and weight of the former engine, is that a lot of collision experience obtained from tests and real cases related to engine-equipped vehicles can be used for various purposes. This is in contrast to new vehicle platform designs where the battery pack is arranged under the floor and where collision experience is rare.

Engines placed in the engine bay are generally allowed to come loose from its mountings to the vehicle body frame structure in case of a head-on collision (of sufficient magnitude) and crash with the object collided into. A battery pack cannot be allowed to simply be released from the frame structure as it could lead to hazardous damages to the battery pack. Therefore, the first absorbing structure is arranged between the battery pack and the front of the vehicle.

To further reduce the risk of puncturing the battery pack an impact load distributor is preferably arranged to cover at least the front side of the battery pack. As an example, the impact load distributor may comprise a 50 mm honeycomb aluminium structure and a high strength steel plate with a thickness of around 2 mm.

The battery pack as such is preferably made to be rigid to prevent penetration and deformation. This can be accomplished by designing the battery pack to be made up of rigid boxes arranged on top of each other so as to define a number of shear planes. A plurality of smaller battery units can be arranged in each of the battery boxes. This provides for a modular concept with scalability properties.

The battery box is preferably arranged so that the number of vertically arranged boxes can vary. A battery pack with lower height can thus easily be provided if, for instance, there is a desire to make room for an electric motor at the front wheels of the vehicle below the battery pack.

Additional batteries may be arranged in the former exhaust tunnel of a former engine-driven vehicle. These additional batteries may be arranged on the same sub-frame as the battery pack in the "engine bay".

In an embodiment of the invention, the first absorbing structure extends in a substantially longitudinal direction of the vehicle between the battery pack and a front of the vehicle.

In an embodiment of the invention, the first absorbing structure comprises a deformation structure capable of absorbing collision energy while deforming when subjected to a compression force directed in the longitudinal direction of the vehicle.

In an embodiment of the invention, the battery pack is arranged in a front portion of the vehicle in association with front wheels of the vehicle.

In an embodiment of the invention, the vehicle comprises a passenger compartment and wherein the battery pack is arranged in front of the passenger compartment.

According to the invention, the battery pack is releasably attached to the vehicle body frame structure so as to be capable of being decoupled from the vehicle body frame structure in the event of an accident.

In an embodiment of the invention, the battery pack is arranged on a sub-frame. This may be a sub-frame that supports the (front) wheel suspension of the vehicle. Preferably, the sub-frame is releasably attached to the vehicle body frame structure so as to be capable of being decoupled from the vehicle body frame structure together with the battery pack in the event of an accident. Preferably, the first absorbing structure comprises at least one part that also forms part of the sub-frame.

In an embodiment of the invention, the vehicle body frame structure comprises first and second transversally spaced longitudinal beams extending in a longitudinal direction of the vehicle between a front portion and a rear portion thereof, wherein the frame structure further comprises at least a first transversal beam extending between the longitudinal beams at the front of the vehicle.

In an embodiment of the invention, the battery pack is arranged rearwards of the first transversal beam.

In an embodiment of the invention, the electric motor is operatively connected to at least one driving wheel of the vehicle.

In an embodiment of the invention, the battery pack comprises a plurality of rigid boxes arranged on top of each other so as to define a number of shear planes.

In an embodiment of the invention, a front side of the battery pack is provided with an impact load distributor.

The term "vehicle body frame" structure is intended to mean the main supporting structure of the vehicle to which all (or most) other components are attached. Main functions of the vehicle body frame are to support components and body and to handle various static and dynamic loads.

The term "sub-frame" is intended to mean a structural frame component used to reinforce or complement a particular section of the vehicle body frame structure. The sub-frame is typically used to attach the suspension to the vehicle.

BRIEF DESCRIPTION OF DRAWINGS

In the description of the invention given below reference is made to the following figures, in which.

DESCRIPTION OF EXAMPLE EMBODIMENTS OF THE INVENTION

Figure 1:
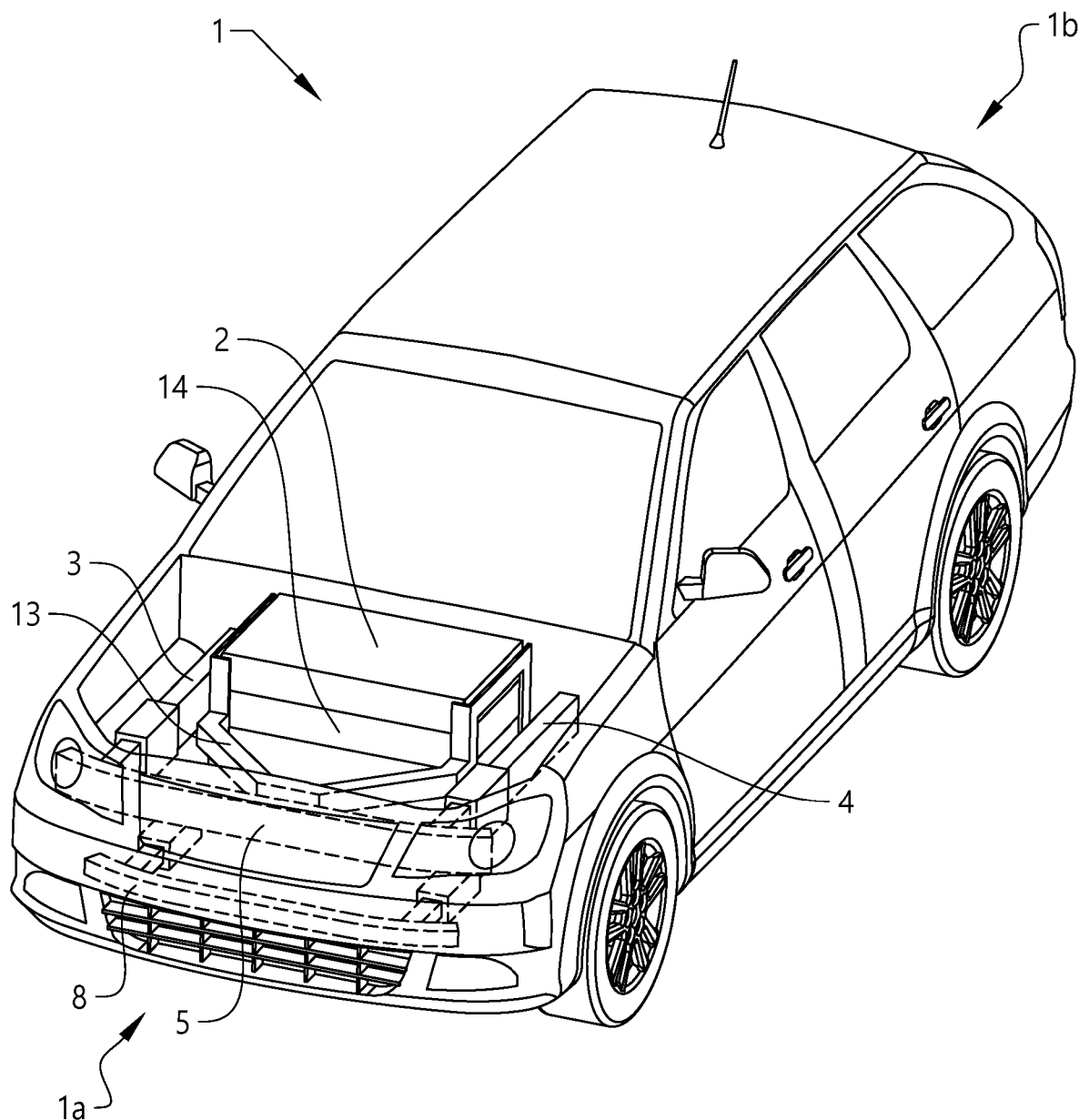
FIG. 1 shows an embodiment of an electric vehicle provided with a battery pack, frame structure and a collision energy absorbing system according to the invention.

FIG. 1 shows an embodiment of an electric vehicle 1 having a front 1a and a rear 1b. The vehicle 1 comprises an electric motor (not shown in the figures) operatively connected to the driving wheels of the vehicle 1 and a battery pack 2 configured to supply the electric motor with electric power for driving the vehicle 1.

The vehicle further comprises a vehicle body frame structure including first and second side members 3, 4 that extend in a longitudinal direction of the vehicle at opposite sides thereof, wherein the side members 3, 4 are connected by a main bumper beam 5 extending transversally at the front 1a of the vehicle 1. The vehicle body frame structure is configured to form a main supporting structure of the vehicle 1 and comprises more parts than shown in the schematic figures; only a few front parts are shown in the figures.

Figure 2A:
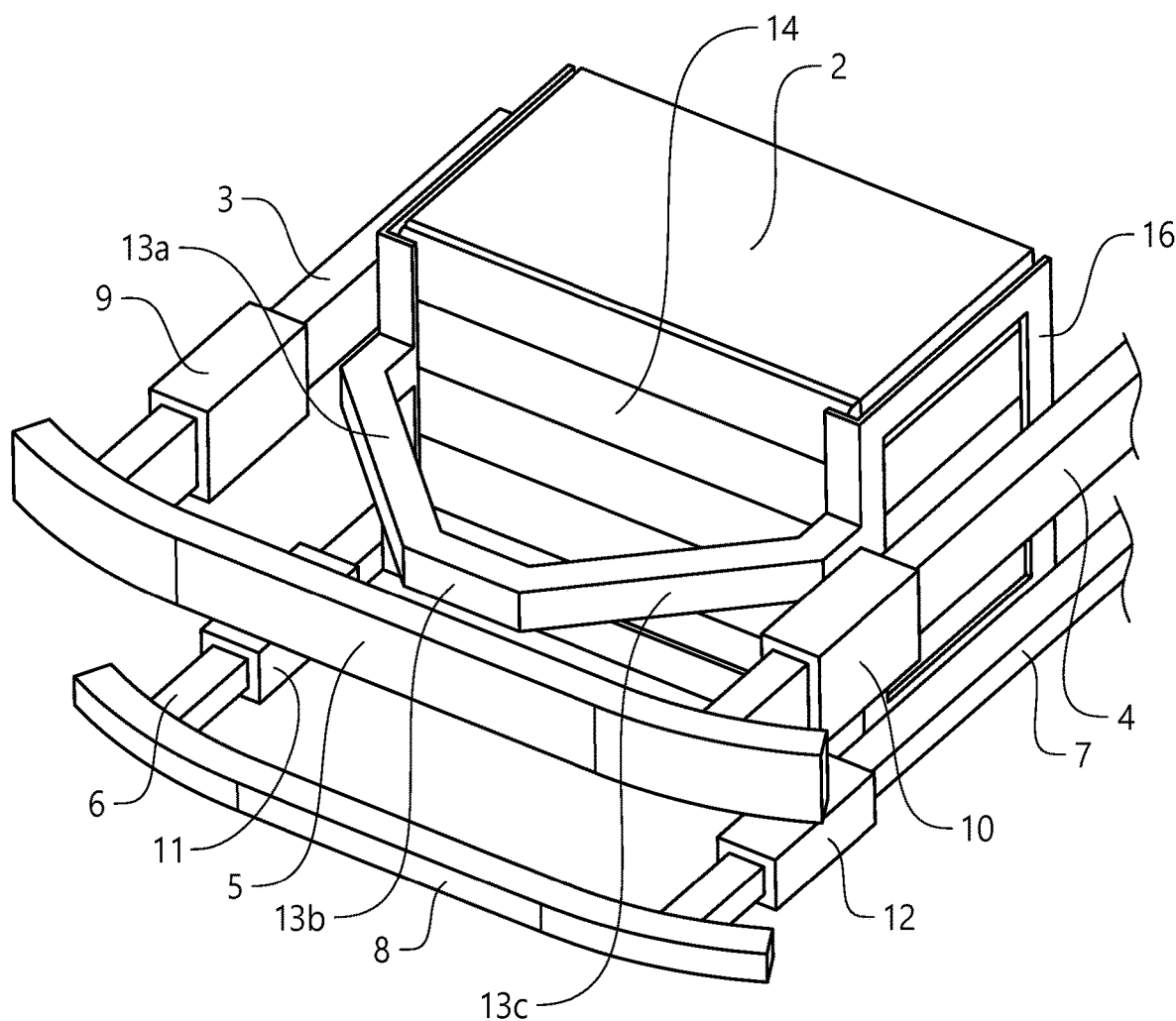
FIG. 2a shows the battery pack, the frame structure and the collision energy absorbing system according to FIG. 1.
Figure 2B:
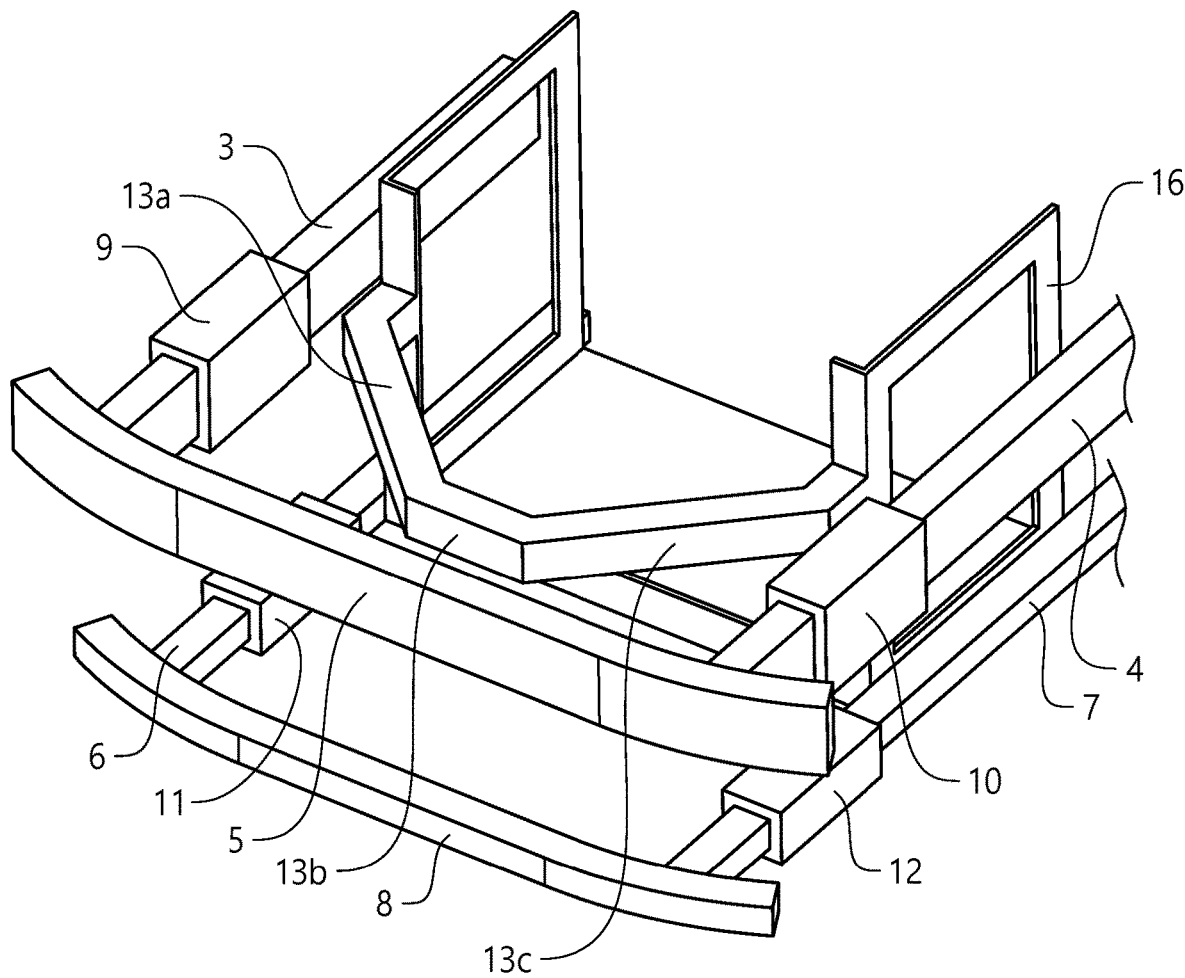
FIG. 2b shows the frame structure and the collision energy absorbing system according to FIG. 2a with the battery pack removed.

FIGS. 2a and 2b show the main parts of FIG. 1. In FIG. 2b the battery pack 2 has been omitted.

The battery pack 2 is arranged onto a sub-frame comprising first and second secondary side members 6, 7 (see FIGS. 2a and 2b) that extend in a longitudinal direction of the vehicle at opposite sides thereof below the main side members 3, 4. The secondary side members 6, 7 are connected by a secondary bumper beam 8 extending transversally at the front 1a of the vehicle 1 below the main bumper beam 5.

The sub-frame is provided with a frame 16 for holding the battery pack 2 in place.

The sub-frame is in this example attached to the vehicle body frame structure in a releasable manner so that when the vehicle body frame structure is subject to a deceleration that exceeds a threshold value, the sub-structure is decoupled and can move in a forward direction in relation to the vehicle body frame structure.

The vehicle is further provided with a collision energy absorbing system configured to absorb collision energy in the event of an accident, in particular a head-on collision. This system includes: first and second crumple crash boxes 9, 10 integrated with the first and second main side members 3, 4 respectively (see FIGS. 2a and 2b); third and fourth crumple crash boxes 11, 12 integrated with the first and second secondary side members 6, 7 respectively (see FIGS. 2a and 2b); and an absorbing member 13 arranged at a front side 14 of the battery pack 2 extending towards a rear side of the main bumper beam 5.

The collision energy absorbing system may of course comprise further parts not shown in the figures, such as sections of the side members 3, 4, 6, 7 designed to bend upon exposure to collision forces and various parts located, e.g., at the sides and at the rear 1b of the vehicle. This system is only schematically shown in the figures.

The collision energy absorbing member 13 comprises in this example first and second deformable bars 13a, 13c, extending from opposite side portions of the battery pack 2 in a diagonally forward direction towards a centreline of the vehicle 1 so that the two bars 13a, 13c and the front side 14 of the battery pack 2 roughly forms a triangle with the tip/apex pointing towards the front 1a of the vehicle 1. The tip part of the triangle is, however, not present. Instead, the first and second bars 13a, 13c are somewhat shortened and connected at their front ends with a further, transversal bar 13b.

A first absorbing structure that extends in a substantially longitudinal direction of the vehicle 1 between the battery pack 2 and a front 1a of the vehicle 1 is in this example formed by the collision energy absorbing member 13 together with the front part of the sub-frame in the form of the secondary bumper beam 8 and the first and second secondary side members 6, 7, including the third and fourth crumple crash boxes 11, 12 integrated with the first and second secondary side members 6, 7.

The first absorbing structure is configured to, in case the vehicle 1 is subject to a head-on collision with an object, act against said object and absorb collision energy of the battery pack 2 without transferring battery pack collision energy to the vehicle body frame structure. That is, the vehicle body frame structure does not have to be designed to handle the additional collision energy of the battery back 2.

An example of a head-on collision with an object in the form of a vertical wall will now be described. First, the wall will act onto and crash any exterior parts of the vehicle positioned in front of the bumper beams 5, 8, such as the grille in this example. In the next phase, the object will act onto the main (upper) and secondary (lower) bumper beams 5, 8 and press them towards the rear 1b of the vehicle 1. This will cause the crumple crush boxes 9, 10, 11, 12 to deform/collapse so that the bumper beams 5, 8 move rearwards. (The bumper beams 5, 8 themselves may also deform and absorb collision energy, for instance by giving them a curved shape in the transversal direction so that they deform by straightening out during the collision.) After some milliseconds the main bumper beam 5 comes in contact with the front portion, i.e., the transversal bar 13b, of the absorbing member 13. In the next phase the object/wall will act onto the absorbing member 13 via the main bumper beam 5 (and the absorbing member 13 will thus also act onto the object/wall via the bumper beam 5) so that the first and second 13a, 13c start to deform/bend while absorbing energy. At this stage, also the four side members 3, 4, 6, 7, are likely to start to deform in some way, even in a case where they are not particularly designed to deform in a controlled manner. If the main part of the vehicle, i.e. the vehicle body frame structure, at this stage comes to a stop but the absorbing member 13 is still not fully deformed, the sub-structure may decouple from the body frame structure (depending on the threshold set for the decoupling and the particulars of the collision) so that the movement of the battery pack 2 can be further slowed down by further deformation of the absorbing member 13 and the secondary side members 6, 7.

The collision energy of the battery pack 2 is thus absorbed by the secondary side members 6, 7 and their crash boxes 11, 12 (and possibly also by the secondary bumper beam 8) as well as by the absorbing member 13; this collision energy is not transferred to the vehicle body frame structure.

Figure 3:
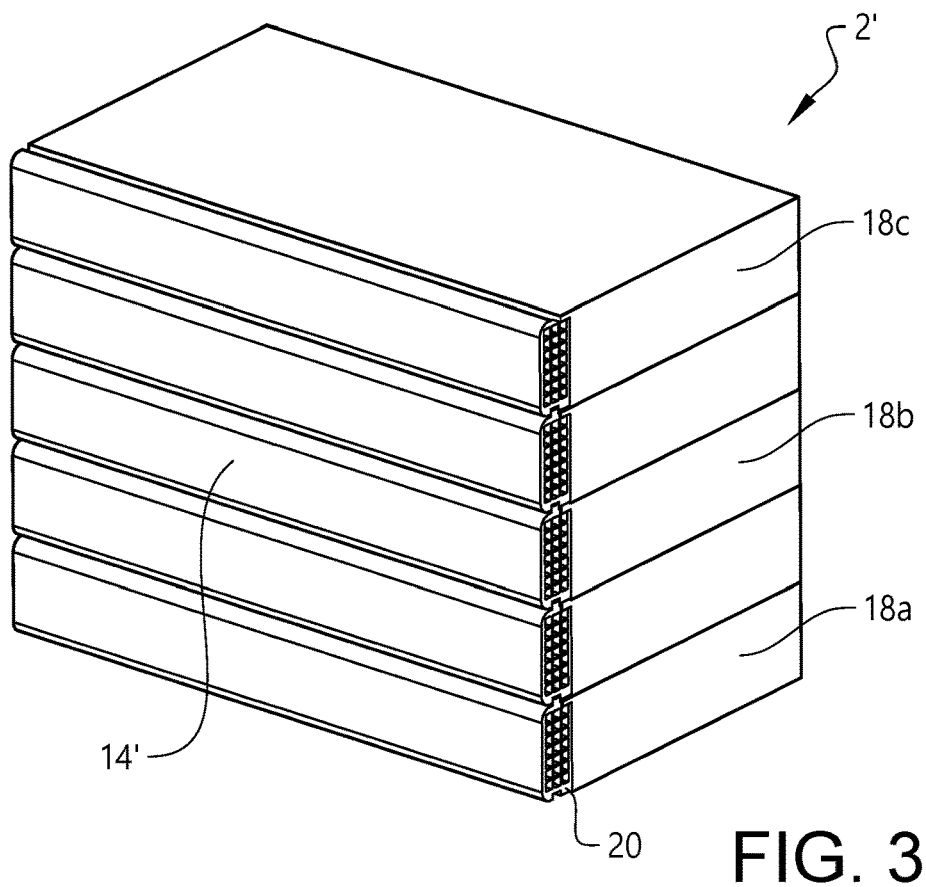
FIG. 3 shows a variant of the battery pack.
Figure 4:
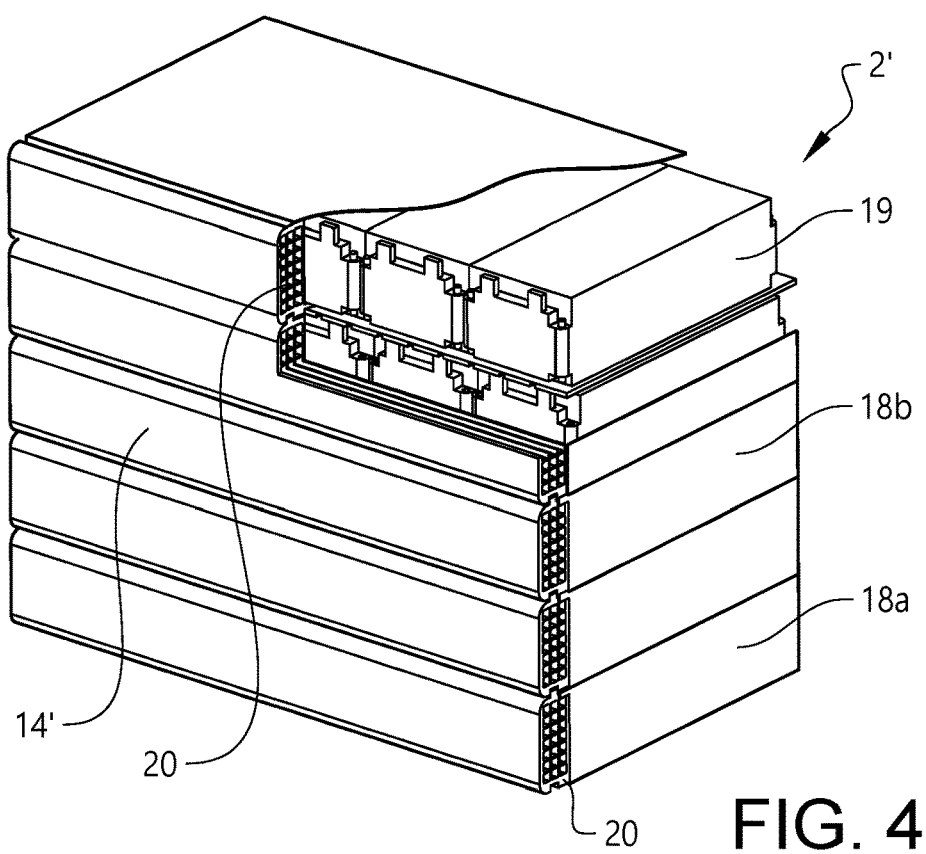
FIG. 4 shows a partial sectional view of the battery pack according to FIG. 3.

FIG. 3 shows a variant of the battery pack 2' and FIG. 4 shows a partial sectional view of the battery pack 2' according to FIG. 3. As indicated in FIGS. 3 and 4, the battery pack 2' is made up of, in this example, five, rigid boxes 18a, 18b, 18c arranged on top of each other so as to define a number of shear planes. This makes the battery pack 2' rigid as a whole. A plurality of smaller battery units 19 can be arranged in each of the battery boxes 18a, 18b, 18c.

The battery pack 2' is arranged so that the number of vertically arranged boxes can vary. A battery pack with lower height can thus easily be provided if, for instance, there is a desire to make room for an electric motor at the front wheels of the vehicle 1 below the battery pack 2'.

The battery pack 2' is provided with an impact load distributor 20 that covers the front side 14' of the battery pack 2'. This reduces the risk of puncturing the battery pack 2' in case of a frontal collision. As an example, the impact load distributor may comprise a 50 mm honeycomb aluminium structure and a high strength steel plate with a thickness of around 2 mm.

The invention is not limited by the embodiments described above but can be modified in various ways within the scope of the claims. For instance, the battery pack 2 need not necessarily be arranged onto a sub-frame but may be mounted to the vehicle body frame structure in different ways. The mounts are preferably breakable/releasable so that the battery pack can decouple if needed. What is important is that the first absorbing structure is arranged between the battery pack and the vehicle front so that it can absorb the collision energy of the battery pack.

Further, the first absorbing structure does not have to include parts of any sub-frame but may comprise one or several separate absorbing members positioned between the battery back and the vehicle front. Such absorbing member(s) may include deformable/bendable bars as exemplified above, but various designs are possible.

Further, the vehicle body frame structure and the sub-frame may have a different design than exemplified above.

The battery pack 2, 2' as such may be designed in different ways.

What is claimed is:

1. Vehicle driven by at least one electric motor, comprising:
   a battery pack configured to supply the electric motor with electric power for driving the vehicle,
   a vehicle body frame structure configured to form a main supporting structure of the vehicle, and
   a collision energy absorbing system configured to absorb collision energy in the event of an accident,
   wherein the collision energy absorbing system comprises a first absorbing structure that is positioned between the battery pack and a front of the vehicle, and
   wherein the battery pack is releasably attached to the vehicle body frame structure and is adapted to be decoupled from the vehicle body frame structure in the event of an accident.

2. Vehicle according to claim 1, wherein the first absorbing structure extends in a substantially longitudinal direction of the vehicle between the battery pack and a front of the vehicle.

3. Vehicle according to claim 1, wherein the first absorbing structure comprises a deformation structure.

4. Vehicle according to claim 1, wherein the battery pack is arranged in a front portion of the vehicle in association with front wheels of the vehicle.

5. Vehicle according to claim 1, wherein the vehicle comprises a passenger compartment and wherein the battery pack is arranged in front of the passenger compartment.

6. Vehicle according to claim 1, wherein the battery pack is arranged on a sub-frame.

7. Vehicle according to claim 6, wherein the first absorbing structure comprises at least one part that also forms part of the sub-frame.

8. Vehicle according to claim 1, wherein the vehicle body frame structure comprises first and second transversally spaced longitudinal beams extending in a longitudinal direction of the vehicle between a front portion and a rear portion thereof, wherein the frame structure further comprises at least a first transversal beam extending between the longitudinal beams at the front of the vehicle.

9. Vehicle according to claim 8, wherein the battery pack is arranged rearwards of the first transversal beam.

10. Vehicle according to claim 1, wherein the battery pack comprises a plurality of rigid boxes arranged on top of each other so as to define a number of shear planes.

11. Vehicle according to claim 1, wherein a front side of the battery pack is provided with an impact load distributor comprising a 50 mm honeycomb aluminum structure and a high strength steel plate with a thickness of around 2 mm.

12. Vehicle driven by at least one electric motor, comprising:
 a battery pack configured to supply the electric motor with electric power for driving the vehicle,
 a vehicle body frame structure configured to form a main supporting structure of the vehicle, and
 a collision energy absorbing system configured to absorb collision energy in the event of an accident,
 wherein the collision energy absorbing system comprises a first absorbing structure that is positioned between the battery pack and a front of the vehicle, and
 wherein the battery pack comprises a plurality of rigid boxes arranged on top of each other so as to define a number of shear planes.

13. Vehicle driven by at least one electric motor, comprising:
 a battery pack configured to supply the electric motor with electric power for driving the vehicle,
 a vehicle body frame structure configured to form a main supporting structure of the vehicle, and
 a collision energy absorbing system configured to absorb collision energy in the event of an accident,
 wherein the collision energy absorbing system comprises a first absorbing structure that is positioned between the battery pack and a front of the vehicle, and
 wherein a front side of the battery pack is provided with an impact load distributor comprising a honeycomb aluminum structure and a high strength steel plate.

\* \* \* \* \*